(12) United States Patent
Poggi

(10) Patent No.: US 12,552,491 B2
(45) Date of Patent: Feb. 17, 2026

(54) BICYCLE WITH TWO INDEPENDENT DRIVE WHEELS

(71) Applicant: BLACKBIKE LTD., Valletta (MT)

(72) Inventor: Paul Poggi, Valletta (MT)

(73) Assignee: BLACKBIKE LTD, Valletta (MT)

( * ) Notice: Subject to any disclaimer, the term of this patent is extended or adjusted under 35 U.S.C. 154(b) by 666 days.

(21) Appl. No.: 17/995,632

(22) PCT Filed: Apr. 10, 2021

(86) PCT No.: PCT/EP2021/059693
§ 371 (c)(1),
(2) Date: Oct. 6, 2022

(87) PCT Pub. No.: WO2021/209515
PCT Pub. Date: Oct. 21, 2021

(65) Prior Publication Data
US 2023/0211851 A1    Jul. 6, 2023

(30) Foreign Application Priority Data
Apr. 14, 2020 (FR) ...................................... 2003731

(51) Int. Cl.
*B62M 6/00* (2010.01)
*B62J 45/412* (2020.01)
(Continued)

(52) U.S. Cl.
CPC .............. *B62M 6/50* (2013.01); *B62J 45/412* (2020.02); *B62J 45/414* (2020.02);
(Continued)

(58) Field of Classification Search
CPC .......... B62M 6/50; B62M 6/60; B62M 9/121; G06N 20/00; B62J 45/412; B62J 45/414;
(Continued)

(56) References Cited

U.S. PATENT DOCUMENTS 6,299,189 B1    10/2001 Chao
8,186,698 B2 *   5/2012 Gunderson ............ B62K 25/10
                                              280/282
(Continued)

FOREIGN PATENT DOCUMENTS

CH           711724 A2 *   5/2017 ............. B60G 21/05
DE           20003301 U1    5/2000
(Continued)

OTHER PUBLICATIONS

ISR; European Patent Office; Netherlands; Aug. 3, 2021.

*Primary Examiner* — Zakaria Elahmadi
(74) *Attorney, Agent, or Firm* — Patshegen IP; Moshe Pinchas

(57) ABSTRACT

The bike (10) comprises a frame provided with a front wheel (12) oriented by a handlebar, a saddle (39) and a crankset. The bike (10) further comprises two pivoting rear uprights (18, 19) each carrying a rear wheel (22, 23), the pivoting rear uprights being mounted by independent pivot links on the frame.
The crankset actuates two drive means (26, 27, 59, 60) independent of the rear wheels. The drive means of each rear wheel comprises a free wheel (59, 60). The drive means are configured such that, in a bend, only the rear wheel located on the inside of the bend is driven by the crankset, the rear wheel located on the outside of the bend freewheeling and not being driven by the crankset.

20 Claims, 5 Drawing Sheets

(51) Int. Cl.
    *B62J 45/414*     (2020.01)
    *B62J 45/415*     (2020.01)
    *B62K 5/06*     (2006.01)
    *B62K 5/10*     (2013.01)
    *B62M 6/50*     (2010.01)
    *B62M 6/60*     (2010.01)
    *G06N 20/00*     (2019.01)
    *B62M 9/121*     (2010.01)

(52) U.S. Cl.
    CPC ............. *B62J 45/4151* (2020.02); *B62K 5/06* (2013.01); *B62K 5/10* (2013.01); *B62M 6/60* (2013.01); *G06N 20/00* (2019.01); *B62K 2204/00* (2013.01); *B62M 9/121* (2013.01)

(58) Field of Classification Search
    CPC .......... B62J 45/4151; B62K 5/06; B62K 5/10; B62K 2204/00
    See application file for complete search history.

(56) References Cited

U.S. PATENT DOCUMENTS

| | | | |
|---|---|---|---|
| 9,067,633 B2 * | 6/2015 | Bell | B62B 9/26 |
| 9,193,415 B1 * | 11/2015 | Marquez | B62M 1/36 |
| 9,592,838 B1 * | 3/2017 | Mecklenburg | B62H 1/12 |

FOREIGN PATENT DOCUMENTS

| | | | |
|---|---|---|---|
| JP | 2005219728 A | 12/2004 | |
| JP | 2013141940 A | 7/2013 | |
| KR | 20100036571 A | 4/2010 | |
| WO | 2005066015 A1 | 7/2005 | |

* cited by examiner

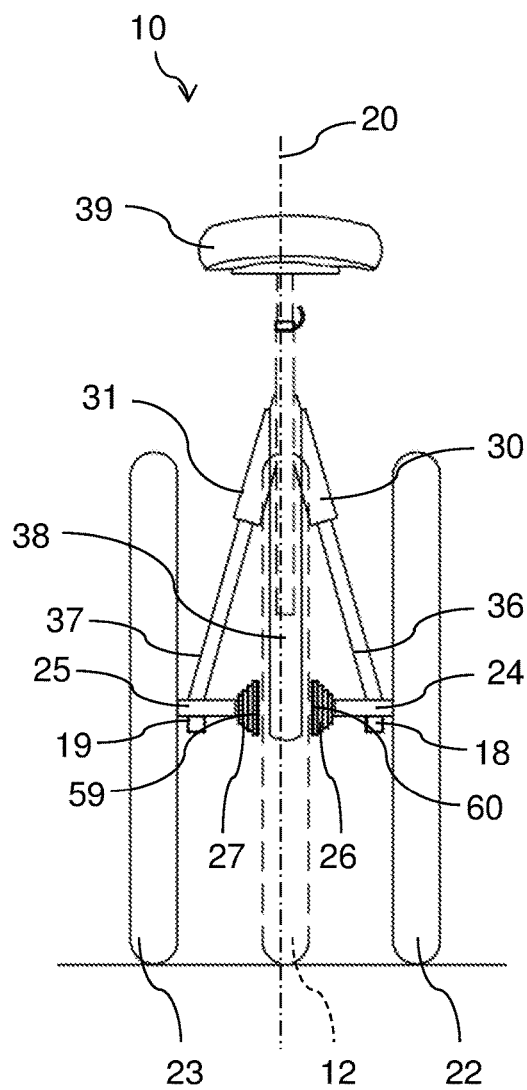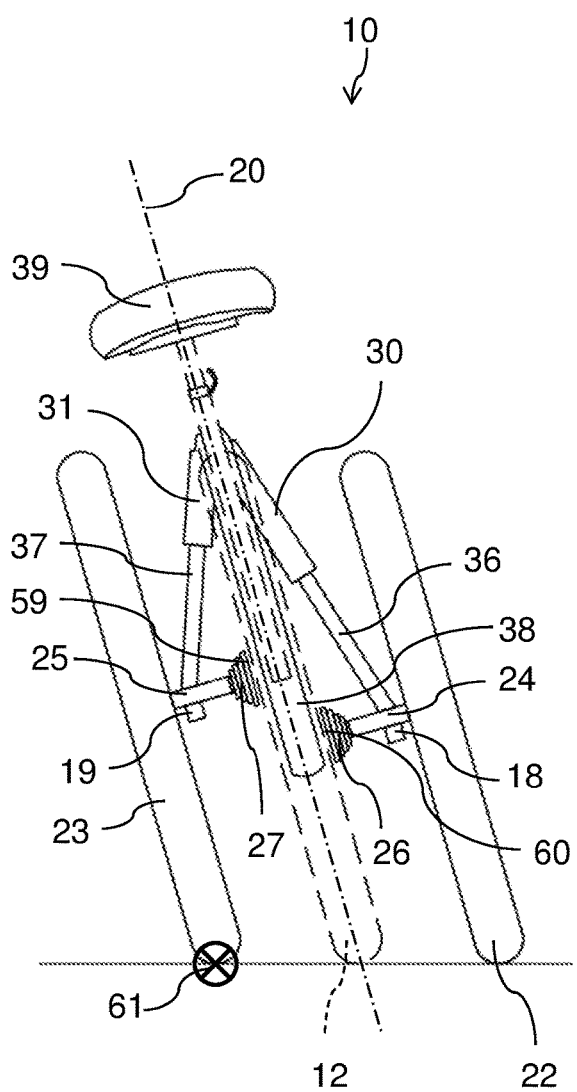
Figure 4
Figure 5

BICYCLE WITH TWO INDEPENDENT DRIVE WHEELS

TECHNICAL FIELD OF THE INVENTION

The present invention envisages a bike with two independent drive wheels. It applies particularly to the field of personal transportation, regardless of whether it is electrically assisted.

STATE OF THE ART

Currently known bikes are bicycles, tricycles, and quadricycles. Bicycles have many drawbacks, especially in towns. This is because they skid easily in slippery zones, for example oil spills, wet cobblestones, or wet road markings. Though they are more stable, tricycles and quadricycles have a width that is too great to allow them to weave in and out between lanes of traffic or to pass each other on bike paths, which it should be noted are 1.3 meters wide.

Document WO 2005/066015 is known, wherein a differential gear train is provided to compensate for the differences in angular speed between the rear wheels, as shown in FIGS. 2, 3 and 4. Consequently, the bike described in that document is simultaneously complex, heavy, fragile, and expensive to produce.

DESCRIPTION OF THE INVENTION

The present invention aims to remedy all or part of these drawbacks.

To this end, the present invention envisages a bike comprising a frame provided with a front wheel oriented by a handlebar, a saddle, a crankset and two pivoting rear uprights, which each carry a rear wheel that leans with the bike's frame, the pivoting rear uprights being mounted by independent pivot links on the frame, the crankset actuating two independent drive means of the rear wheels, the drive means of each rear wheel comprising a free wheel, the drive means being configured such that, in a bend, only the rear wheel located on the inside of the bend is driven by the crankset, the rear wheel located on the outside of the bend being freewheeling and not being driven by the crankset.

Thanks to these provisions, the rear wheels are independent of each other, both with regard to the offset of their rotation axes parallel to the bike's frame, and with regard to their speed of rotation. In this way, the bike that is the subject of the invention can lean over in bends and benefit from increased grip at its rear wheels. In addition, the presence of two rear wheels increases the cyclist's safety by reducing the risk of another vehicle hitting one of his legs or feet.

Because only the rear wheel on the inside of the bend is driven, there is no mechanical force linked to the difference in rotation speed between the rear wheels. In addition, because the rear wheel on the inside of the bend is the only one driven by the action of the crankset, the force applied by the ground on this rear wheel driven by the action of the crankset takes part in straightening the bike. The angle of inclination of the bike is therefore smaller and there is consequently less risk of falling.

Lastly, the bike that is the subject of the invention exhibits very low weight, low complexity, a lower manufacturing cost and increased reliability, since no differential gear train is required to compensate for the differences in the speeds of rotation of the rear wheel in bends.

In some embodiments, the bike that is the subject of the invention comprises a means for blocking the pivot links of the pivoting rear uprights.

Thanks to these provisions, when the means for blocking the pivot links is activated, for example when the bike is travelling at low speed, the bike is stably supported on its three wheels.

In some embodiments, the means for locking the pivot links is configured to block the relative position of the pivoting rear uprights.

Thanks to these provisions, even if the ground is sloping, the bike is stable on its three wheels when the blocking means is activated.

In some embodiments, the bike that is the subject of the invention comprises a means for inhibiting the means for blocking the pivot links, and a means for controlling the inhibition means according to the speed of the bike.

Thanks to these provisions, when the bike's speed increases, the pivot links are free, allowing the bike to lean over in bends. In contrast, at low speeds or when stopped, the bike is stable on its three wheels. Consequently, the cyclist can keep his feet on the crankset when the bike is at a standstill.

In some embodiments, the means for controlling the inhibiting means comprises an accelerometer.

The accelerometer triggers the inhibition of the blocking means as soon as the acceleration direction of the bike's and the cyclist's centre of gravity leave the triangle formed by the wheels' points of contact on the ground, i.e. as soon as the bike is unstable. In this way, if the ground slope is not constant or when the bike enters a bend, unlocking the relative position of the pivoting rear uprights makes it possible for the cyclist to rebalance the bike. Note that the accelerometer may be electronic, of a type known in smartphones; or mechanical, of a type known in pinball machines, with a dampened pendulum that makes electric contact beyond a certain angle of inclination.

In some embodiments, the drive means of the rear wheels each comprise a chain mounted between one gear wheel of the crankset, and at least one sprocket attached to a rear wheel, each chain passing over a pivoting rear upright, each pivoting rear upright supporting the shaft on one rear wheel between each said sprocket and said rear wheel.

Thanks to these provisions, the forces on the pivoting rear uprights are reduced.

In some embodiments, each pivoting rear upright is shaped as a half-sinusoid between two sinusoid peaks.

In some embodiments, the bike that is the subject of the invention comprises, between the frame and the shaft of each rear wheel, a rear damper resting on the shaft of the rear wheel at the same location as the pivoting rear upright carrying the rear wheel.

Thanks to these provisions, the cyclist's comfort is increased and the forces on the pivoting rear uprights are reduced.

In some embodiments, the gap between the rear wheels is smaller than 31 centimetres.

In this way, the bike that is the subject of the invention can weave in and out between the lines of cars.

In some embodiments, the bike that is the subject of the present invention comprises a motor drive for the rear wheels.

The motor drive, in particular electric, may, depending on the variants, drive the crankset, or directly drive each of the rear wheels or the front wheel.

In some embodiments, the motor drive comprises two motors, each incorporated in a rear wheel. Thus, the force applied by each of the rear wheels on the ground can be modulated, for example as a function of the balance of the bike.

In some embodiments, the bike comprises a module for controlling the power applied by each of said motors to each of the rear wheels.

In some embodiments, the front wheel comprises a motor that actuates it, the control module also controlling the power applied by the front wheel motor.

In some embodiments, the bike comprises a motor drive for orienting the handlebar, the control module also controlling the handlebar orientation motor.

In some embodiments, the control module for the power applied by each of said motors is connected to: a sensor of the angle of the frame relative to the vertical; a sensor of the speed of the bike; and a sensor of the angular position of the handlebar; the control module being configured such that the power applied by each motor incorporated in a wheel gives rise to a differential of the forces applied by the ground on the bike, this differential matching a moment of these forces relative to the centre of gravity of the bike and of the cyclist, based on the speed, the angular position of the handlebar and the inclination of the bike.

Thanks to these provisions, the control module can compensate for slight instability of the bike.

In some embodiments, the control module is configured to achieve a gradual curve through bends and good stability of the bike.

In some embodiments, the control module is configured to achieve the stability of the bike both in a straight line and in curves, by correcting slight inclinations of the bike by managing forces applied on the ground by the wheels in response to the forces applied by the motors.

In some embodiments, the control module utilizes a function linking the values of speed, angular position of the handlebar, and the inclination of the bike due to the forces applied by the motors, which function is determined by automatic learning.

In some embodiments, the automatic learning is carried out by experienced cyclists and learner cyclists, with the sudden inclination of the bike corresponding to a failure and a long period of time without a sudden inclination corresponding to a success.

In some embodiments, the automatic learning continues with the user of the bike.

BRIEF DESCRIPTION OF THE FIGURES

Other advantages, aims and particular features of the invention will become apparent from the non-limiting description that follows of at least one particular embodiment of the bike that is the subject of the present invention, with reference to drawings included in an appendix, wherein:

FIG. 4 represents, from the rear, a partial view of the bike illustrated in FIGS. 1 to 3, in its straight-line travelling configuration;

FIG. 5 represents, from the rear, a partial view of the bike illustrated in FIGS. 1 to 3, in its left-hand turn travelling configuration;

DESCRIPTION OF THE EMBODIMENTS

The present description is given in a non-limiting way, in which each characteristic of an embodiment can be combined with any other characteristic of any other embodiment in an advantageous way.

Note that each of the figures is to scale, but that the scale may vary from one figure to another.

Figure 1:
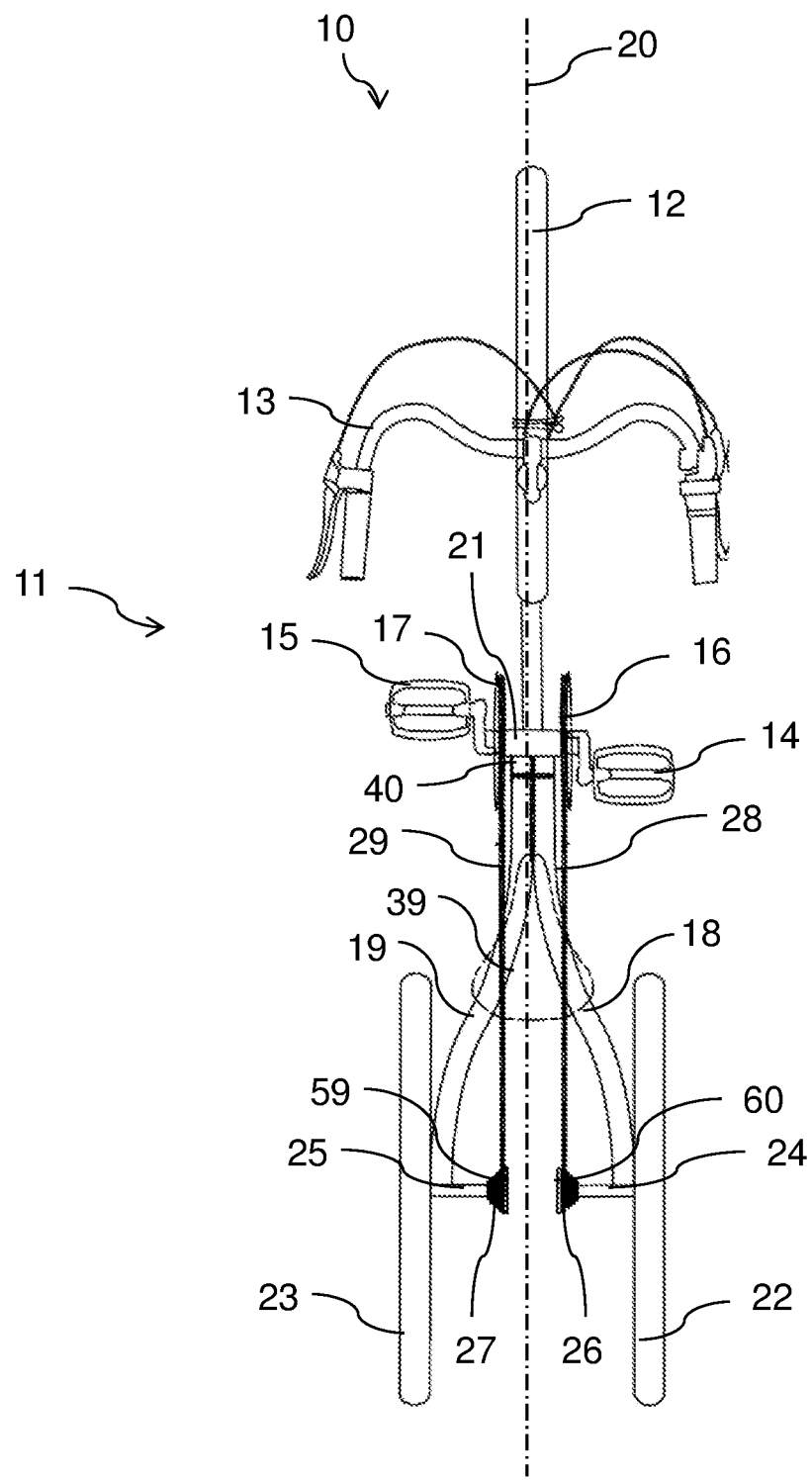
FIG. 1 represents a top view of a particular embodiment of the bike that is the subject of the invention.

Throughout the description, "lower" means whatever is at the bottom in the normal use configuration of the bike that is the subject of the invention and nearer the bottom in FIGS. 2 to 5; and "upper" means whatever is at the top in FIGS. 2 to 5. "Front" or "forward" means whatever is oriented towards the front of the bike, at the top in FIG. 1; and "at the back" or "rear" means whatever is close to or oriented towards the rear of the bike, at the bottom in FIG. 1. Similarly, "internal" means whatever is close to or oriented toward an overall plane of symmetry 20 of the bike; and "external" means whatever is far from or oriented to the opposite in this plane of symmetry 20.

Throughout the description, for clarity, the following items, which may be incorporated in the bike that is the subject of the invention, have not been represented: mudflaps, lights, a reflector, a rear-view mirror, a sound alarm, a front damper, an anti-theft device, a luggage rack, synchronized derailers, a gear ratio selector lever, and chain covers.

Figure 2:
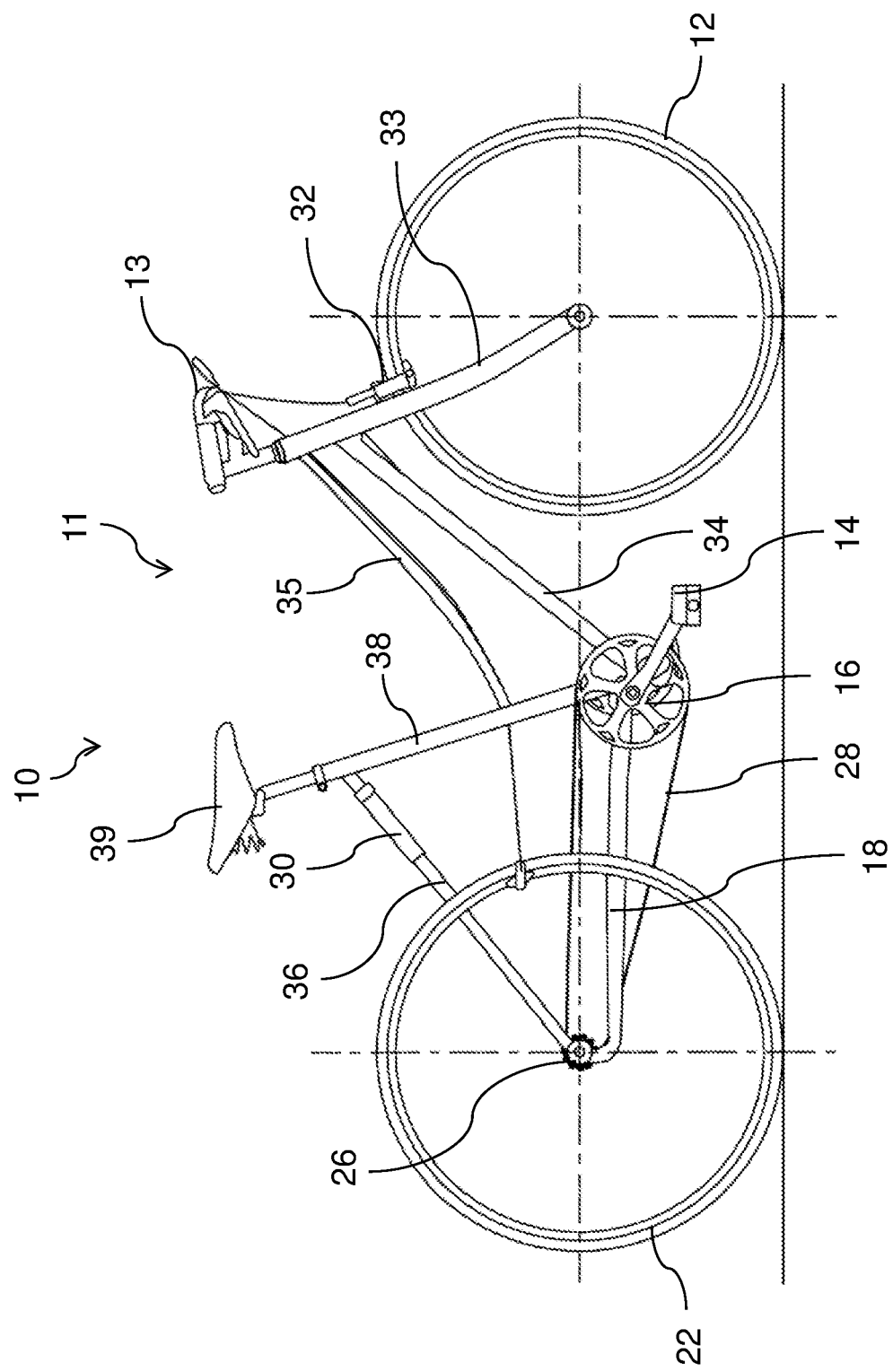
FIG. 2 represents a side view of the bike illustrated in FIG. 1.
Figure 3:
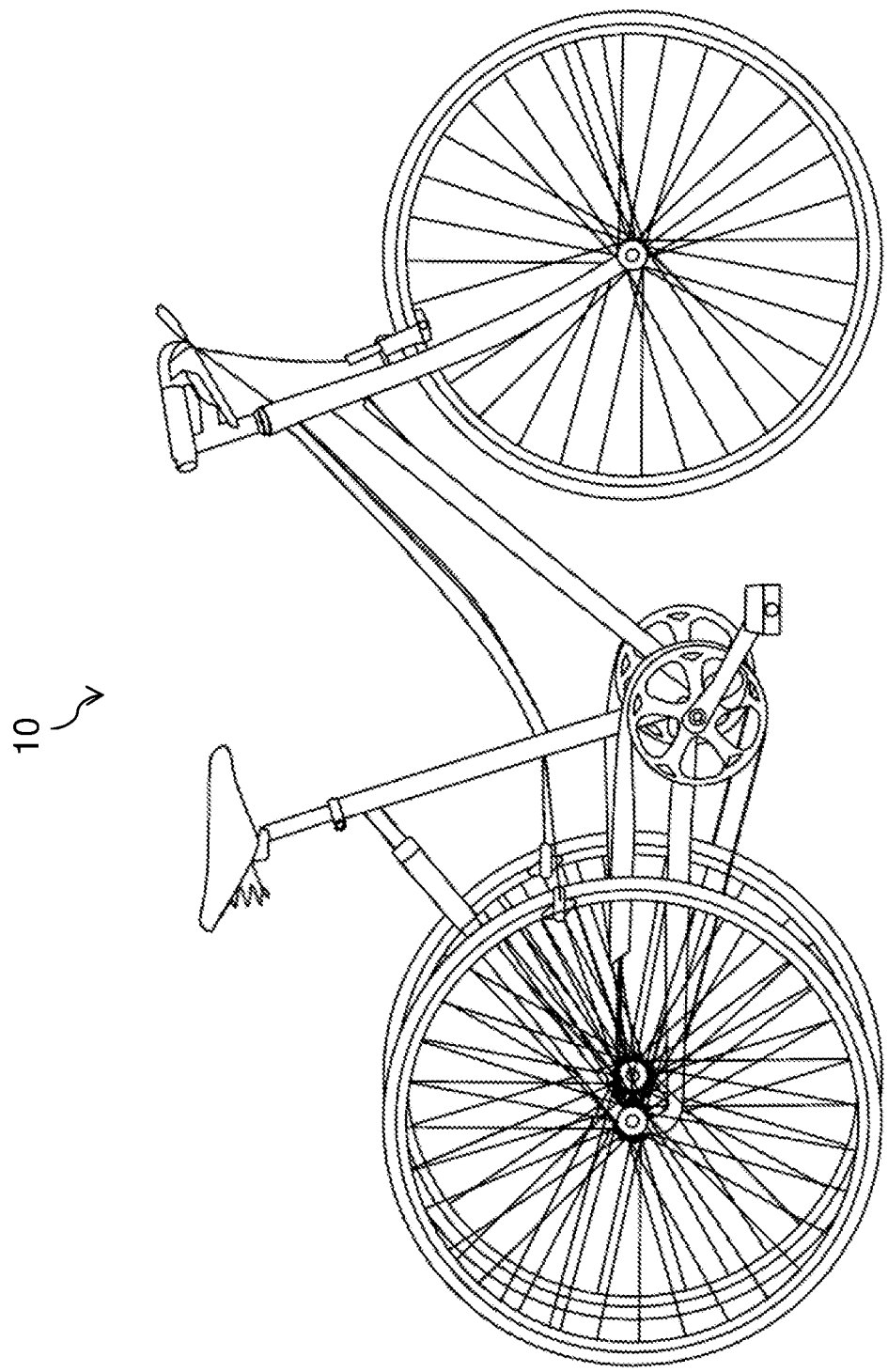
FIG. 3 represents a partial perspective view of the bike illustrated in FIGS. 1 and 2.

FIGS. 1 to 5 show a bike 10 that is the subject of the invention, having an overall plane of symmetry 20. The bike 10 comprises a frame 11 provided with a front wheel 12 oriented by a handlebar 13, a saddle 39 and a crankset 14, 15. The frame 11 comprises, as shown in FIG. 2, a front fork 33 linking the handlebar 13 to the shaft of the front wheel 12 and carrying a brake 32. The frame 11 also comprises an oblique front upright 34 linking a bearing housing (not shown) surrounding the front fork 33 to a bearing housing 21 of the crankset. The frame further comprises an oblique upright 38 linking the bearing housing 21 to the saddle 39 and a central oblique upright 35 linking the bearing housing (not shown) of the front fork 33 to an intermediate portion of the upright 38.

The crankset 14, 15 actuates two independent drive means of the rear wheels 23 and 22, these drive means being fitted with free wheels (not shown).

Thus, the bike 10 comprises a frame 11 provided with a front wheel 12 oriented by a handlebar 13, a saddle 39, and a crankset 14 and 15. This frame 11 is connected to two rear pivoting uprights 18 and 19, each bearing one rear wheel 22 and 23, respectively, which leans over with the frame 11 of the bike 10. The pivoting rear uprights 18 and 19 are mounted onto the frame 11 with independent pivot links 40, 56 and 57. The crankset 14 and 15 actuates two independent drive means 16, 17, 26, 27, 28, 29, 59 and 60 of the rear wheels. The drive means of each rear wheel comprises a free wheel 59 and 60. The drive means are configured such that, in a bend, only the rear wheel located on the inside of the bend is driven by the crankset, the rear wheel located on the outside of the bend freewheeling and not being driven by the crankset.

In some embodiments (not shown), a universal joint or a belt transmission is utilized for transmitting the rotation of the crankset to the rear wheels.

In the embodiment shown in FIGS. 1 to 5, the means for driving the rear wheels 23 and 22 by the crankset 14, 15 each comprise a chain mounted between one gear wheel of the crankset and at least one sprocket attached to one rear wheel. The crankset comprises one right-hand pedal 14, one left-hand pedal 15, one right-hand gear wheel 16, one left-hand gear wheel 17 and a shaft (not shown) in the bearing housing 21. The right-hand gear wheel 16 drives a right-hand chain 28, which drives a right-hand sprocket 26. The left-hand gear wheel 17 drives a left-hand chain 29, which drives a left-hand sprocket 27. By means of synchronized derailers (not shown), the cyclist chooses the right-hand sprocket 26 and left-hand sprocket 27 from two pluralities of sprockets with different numbers of teeth. By means of a free wheel 59, the left-hand sprocket 27 drives the left-hand rear wheel 23. By means of a free wheel 60, the right-hand sprocket 26 drives the right-hand rear wheel 22.

A bearing housing (not shown) of the left-hand shaft 25 of the left-hand wheel 23 is connected to the frame 11 by a pivoting rear upright 19 connected, as a pivot link, to the bearing housing 21. A bearing housing (not shown) of the right-hand shaft 24 of the right-hand wheel 22 is connected to the frame 11 by a pivoting rear upright 18 connected, as a pivot link, to the bearing housing 21. The axes of the pivot links are parallel to the rotation axis of the crankset in the bearing housing 21.

In some preferred embodiments, such as that shown in the figures, an oblique left-hand rear upright 37 fitted with a pneumatic cylinder damper 31 connects the oblique upright 38 near the saddle 39 to a left-hand bearing housing of the left-hand shaft 25. In these embodiments, an oblique right-hand rear upright 36 fitted with a pneumatic cylinder damper 30 connects the oblique upright 38 near the saddle 39 to a right-hand bearing housing of the right-hand shaft 24.

Preferably, the connection of the left-hand rear oblique upright 37 is attached to the bearing housing at the same location, i.e. at the same distance from the plane 20, as the connection of the left-hand pivoting rear upright 19 of this left-hand bearing housing. Similarly, the connection of the right-hand rear oblique upright 36 is attached to the right-hand bearing housing at the same location, i.e. at the same distance from the plane 20, as the connection of the right-hand pivoting rear upright 18 of this right-hand bearing housing.

In some embodiments, the uprights 37 and 36, as well as the dampers they carry, are replaced by dampers incorporated into the pivot links of the pivoting rear uprights 18 and 19, or located in the vicinity of these pivot links.

As can be seen by reading the description above, the rear wheels 23 and 22 are independent from each other, both in respect of the offset of their axes of rotation due to the pivot links of the pivoting rear uprights 18 and 19, and of the speed of rotation due to their independent drives. As illustrated in FIG. 5, the bike 10 that is the subject of the invention can therefore lean over in bends and benefit from increased grip for its rear wheels 23 and 22. In addition, the presence of two rear wheels 23 and 22 increases the cyclist's safety by reducing the risk of another vehicle hitting one of his legs or one of his feet.

Because only the rear wheel 23 on the inside of the bend is driven, there is no mechanical force linked to the difference in speeds of rotation between the rear wheel 22, which spins faster as it traverses an arc of a circle with a larger radius and is therefore freewheeling, and the rear wheel 23, which is the only one driven by the crankset 14 and 15. In addition, because the rear wheel 23 on the inside of the bend is the only one driven by the action of the crankset 14 and 15, the force 61 (FIG. 5) applied by the ground on this rear wheel 23 (by reaction to the force applied by the wheel 23 on the ground by the action of the crankset 14 and 15) takes part in straightening the bike 10 in the bend. The angle of inclination of the bike is therefore less than with a bicycle and there is consequently a reduced risk of falling.

Note that, because of the simplicity of its drive means for the rear wheels 22 and 23, the bike 10 has a very low weight, a lower manufacturing cost and increased reliability, since no differential gears are utilized to compensate for the differences in the speeds of rotation of the rear wheels 22 and 23 in bends.

In the embodiment shown in the figures:
each chain 28 and 29 passes over a pivoting rear upright, respectively 18 and 19; and
each pivoting rear upright 18 and 19 supports the shaft 24 and 25 of one rear wheel 22 and 23 between each said sprocket 26 and 27 of said rear wheel 22 and 23, respectively.

In other words, the pivoting rear uprights 18 and 19 are closer to the plane of symmetry 20 than the gear wheels 16 and 17 at the location of the crankset, and the pivoting rear uprights 18 and 19 are farther than the sprockets 26 and 27 of the plane of symmetry 20 at the location of these sprockets. Preferably, each pivoting rear upright 18 and 19 is shaped as a half-sinusoid between two sinusoid peaks, i.e. a half sinusoid with parallel extremities. The benefit of this shape is that it allows the gear wheels 16 and 17, and therefore the pedals 14 and 15, to be close to each other.

Preferably, the gap between the rear wheels 22 and 23 is less than 31 centimetres, for example 20 centimetres. In this way, the bike 10 can weave in and out between the lines of cars.

In some embodiments (not shown), the bike that is the subject of the invention comprises an electric or autonomous assistance motor drive, i.e. propelling the bike even if the cyclist does not actuate the crankset, and a battery positioned, for example, between the rear wheels. Depending on the variants, the electric assistance motor drive drives the crankset, or directly drives each of the rear wheels or the front wheel.

In a first variant, the motor drives the crankset such that, in bends, it only drives the rear wheel on the inside of the bend (wheel 23 in FIG. 5).

In a second variant, the motor drive comprises two motors, each incorporated in a rear wheel. In this case, a control module for controlling the power applied by each of the motors may be programmed according to at least one of the following three operating modes:
the driving power is only applied to the rear wheel on the inside of the bend;
the driving power is only applied to the rear wheel on the outside of the bend; or
the driving power is distributed to the two rear wheels.

In some embodiments, in which the motor drive comprises two motors, each incorporated in a rear wheel, the control module for the power applied by each of the motors is connected to: a sensor of the angle of the frame relative to the vertical; a sensor of the speed of the bike; and a sensor of the angular position of the handlebar. The power applied by each motor incorporated into a rear wheel can then be ordered to generate a differential of the forces applied by the ground to the rear wheels, this differential matching a moment of these forces relative to the centre of gravity of the bike and of the cyclist. The control module then manages this differential of forces as a function of the centrifugal force (determined based on the speed and the angular position of the handlebar) and of the inclination of the bike (determined by the vertical position sensor). In this way, the control module can help achieve a gradual curve through bends and good stability of the bike.

In some embodiments, to increase the moment of the forces applied by the wheel to the ground, the front wheel also comprises a motor that actuates it, the control module also controlling the power exerted by the front wheel motor. In some embodiments, which may be combined with the previous ones, to increase the bike's stabilization ability with the control module, the bike also comprises a motor drive for the orientation of the handlebar. In this way, the trajectory of the bike is defined in part by the control module. The moment of the force applied by the handlebar motor drive is sufficiently weak to allow the user to oppose it and impose the start of the bend, with the control module then controlling the balance of the bike in the bend.

In some embodiments, the control module provides the stability of the bike both in a straight line and in curves, by correcting slight inclinations of the bike by managing the forces applied by the motors. The function linking the values of speed, angular position of the handlebar, and inclination of the bike to the motor commands can be determined by theoretical calculations or, preferably, by automatic learning carried out with experienced and/or leaner cyclists, according to known learning techniques, the sudden inclination, for example a change of at least ten degrees in under one second, corresponding to a fall or to the cyclist putting one foot on the ground being, in automatic learning terms, a failure. In contrast, a long period of time, for example at least ten seconds, without this sudden inclination is, in automatic learning terms, a success. In this way, automatic learning leads gradually to an automatic stability function. Preferably, this automatic learning continues with the user (preferably the habitual user) of the bike, because the position of the centre of gravity and the total weight of the bike are variable, depending on the user, his clothing, and any other loads, for example carried on a luggage rack.

In some embodiments, the bike that is the subject of the invention comprises a means for blocking the pivot links of the pivoting rear uprights 18 and 19. For example, this blocking means consists of blocking the dampers, for example the dampers 30 and 32. According to other examples, the blockage occurs at the pivot links of the pivoting rear uprights 18 and 19. For example, each pivot link is linked to a drum or disc brake. Thus, when the means for blocking the pivot links is activated, for example when the bike is travelling at low speed, the bike is stably supported on its three wheels.

In some embodiments, the means for blocking the pivot links is configured to block the relative position of the pivoting rear uprights 18 and 19, while allowing them to pivot together. For example, this blocking of the relative positions is achieved by a drum brake system whose single drum blocks the rotation of each pivot link relative to this drum, as shown in FIG. 6.

Thus, even if the ground is sloping, the bike is stable on its three wheels 12, 23 and 22, when the blocking means is activated. This blocking makes possible a parking position of the bike with its plane of symmetry 20 vertical.

Figure 6:
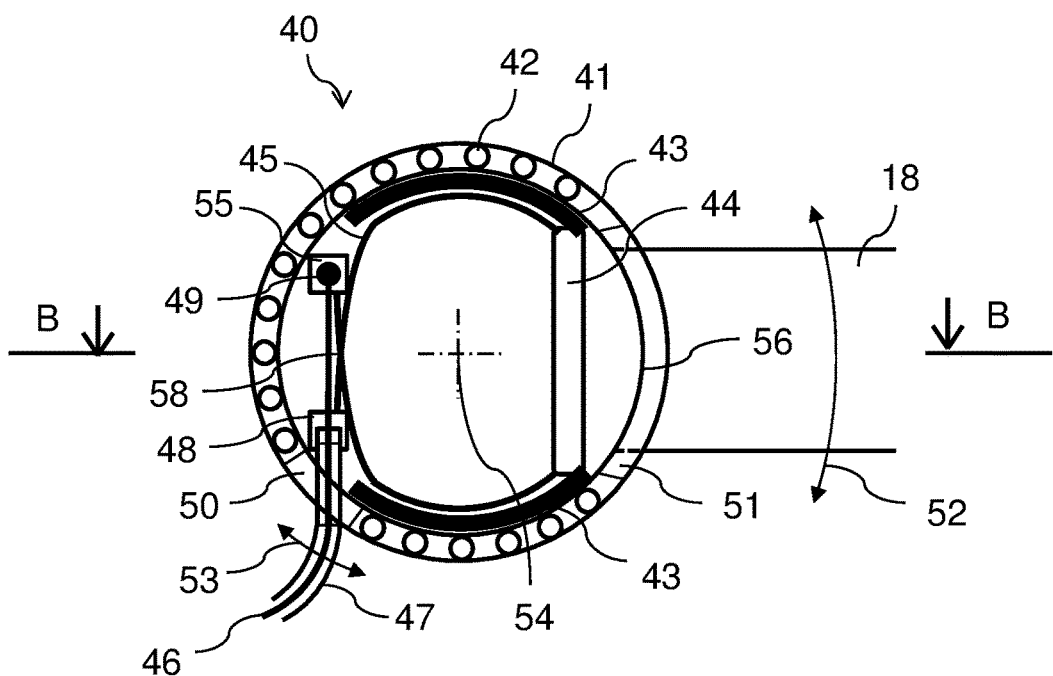
FIG. 6 represents a vertical cross section of a means for blocking the relative positions of the pivot links.
Figure 7:
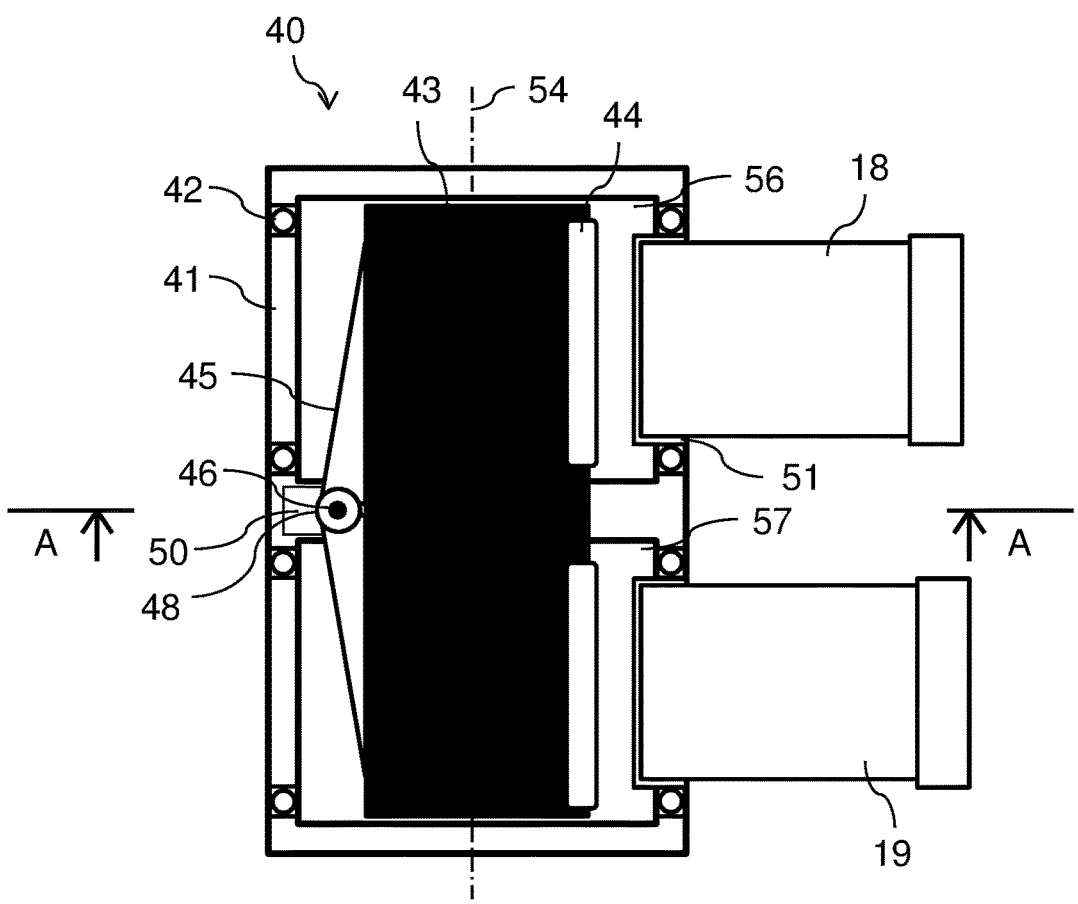
FIG. 7 represents a horizontal cross-section of the blockage means illustrated in FIG. 6.

FIGS. 6 and 7 show a blocking means 40. FIG. 6 is a vertical A-A cross-section (on the plane of symmetry 20). FIG. 7 is a horizontal B-B cross-section, with the pivoting rear uprights 18 and 19 being shown in FIGS. 6 and 7. A bearing housing 41 comprises four ball bearings 42 surrounding the cylinders 56 and 57 attached to the pivoting rear uprights 18 and 19. To make FIG. 6 easier to read, some ball bearings 42 are not shown.

These ball bearings 42 enable the rotation in the direction of the arrow 52, as a pivot link, of the pivoting rear uprights 18 and 19 in the bearing housing 41, around the rotation axis 54. An opening 51 of the bearing housing 40 is wider than the upright 18, allowing the pivoting rear upright 18 to pivot.

Brake pads 43 in the shape of truncated cylinders, whose axis is the axis 54, are carried by a flexible structure 45 having a crisscrossing 58 of rods, and a rigid structure 44. A cable 46 has a spherical extremity 49 held in a housing 55 attached to an extremity of the flexible structure 45. The sheath 47 of the cable 46 is held in a housing 48. The sheath 47 can move in rotation about the axis 54, in the direction of the arrow 53, thanks to an opening 50 in the bearing housing 40. As is easily understood, when the cable 46 is pulled, manually or by an electric motor, the housings 48 and 55 come closer which, thanks to the crisscrossing 58 of the flexible structure 45, causes the moving apart of the pads 43 and the attachment of the pads 43 to the cylinder 56. Since the pads 43 are shared by the two cylinders 56 and 57, the relative positions of the pivoting rear uprights 18 and 19 are blocked by the pads 43.

In a variant in which the blocking means block the position of each of the pivoting rear uprights 18 and 19 relative to the frame 11 of the bike, the pads 43 extend to a shoulder on the bearing housing 40 to become attached to this bearing housing 40.

In some embodiments, the bike 10 comprises a means for inhibiting the means for blocking the pivot links and a means for controlling the inhibition means according to the speed of the bike.

In some first examples, an accelerometer manages the inhibition of the blocking means as soon as the acceleration direction of the bike's and the cyclist's centre of gravity exits the triangle formed by the wheels' points of contact on the ground, i.e. as soon as the bike is unstable. In this way, if the ground does not have a uniform gradient, or when the bike enters a bend, unlocking the relative position of the pivoting rear uprights 18 and 19 makes it possible for the cyclist to rebalance the bike. Note that the accelerometer may be electronic, of a type known in smartphones; or mechanical, of a type known in pinball machines, with a dampened pendulum that makes electric contact beyond a certain angle of inclination.

In some second examples, which supplement or replace the functions of the first examples, the blocking means is activated up to a predefined speed and deactivated (inhibited) beyond this predefined speed. For example, the blocking means is an electrically-activated brake and the control means for this brake is connected to a tachometer measuring the speed of the bike 10. Thus, when the speed of the bike 10 increases, for example beyond a speed chosen by the cyclist or the manufacturer of the bike 10, for example 10 km/h or 15 km/h, the pivot links of the pivoting rear uprights 18 and 19 are free, allowing the bike 10 to lean in the bends, as shown in FIG. 5. In contrast, at low speed, the bike 10 is stable on its three wheels 12, 23 and 22. As a reminder in this respect, a standard bike traveling very slowly is difficult to control. The rider therefore wastes a lot of energy turning the handlebar from left to right to stop falling. The bike that is the subject of the invention prevents this discomfort and loss of energy: through the blocking of the pivot links the cyclist can impose his speed, even very low, with no risk of falling.

The cyclist can also keep his feet on the pedals 14 and 15 when the bike 10 is at a standstill.

This blocking of the pivot links or the pivoting rear uprights 18 and 19 also makes it easier to learn how to ride a bike.

Controlling the blocking, unblocking and/or the inhibiting of the blocking means can be achieved at the handlebar, on one of the uprights 34 or 35, or by mechanically activating the cable 46 with a known means in known types of bike gear changes, or by activating, with a switch, an electric motor that pull or releases the cable 46.

The invention claimed is:

1. A bike comprising a frame provided with a front wheel oriented by a handlebar, a saddle, a crankset, which frame is connected to two pivoting rear uprights, each carrying a rear wheel that leans with the bike's frame, the pivoting rear uprights being mounted by independent pivot links on the frame, the crankset actuating two independent drives of the rear wheels, the drive of each rear wheel comprising a freewheel mechanism, each of the drives being configured such that, in a bend, only the rear wheel located on the inside of the bend is driven by the crankset, while the rear wheel located on the outside of the bend being freewheeling by the freewheel mechanism and not being driven by the crankset.

2. The bike according to claim 1, which further comprises a blocker for blocking the pivot links of the pivoting rear uprights.

3. The bike according to claim 2, wherein the blocker of the pivot links is configured to block a relative position of the pivoting rear uprights.

4. The bike according to claim 2, which further comprises an inhibitor for the blocker of the pivot links and a controller for controlling the inhibitor according to a speed of the bike.

5. The bike according to claim 4, wherein the controller for controlling the inhibitor comprises an accelerometer.

6. The bike according to claim 1, wherein the drives of the rear wheels each comprise a chain mounted between one gear wheel of the crankset, and at least one sprocket attached to a rear wheel, each chain passing over a pivoting rear upright, each pivoting rear upright supporting a shaft of one rear wheel between each said sprocket and said rear wheel.

7. The bike according to claim 1, wherein each pivoting rear upright is shaped as a half-sinusoid between two sinusoid peaks.

8. The bike according to claim 1, which comprises, between the frame and a shaft of each rear wheel, a rear damper resting on the shaft of the rear wheel at a same location as the pivoting rear upright carrying said rear wheel.

9. The bike according to claim 1, wherein a gap between the rear wheels is less than 31 centimetres.

10. The bike according to claim 1, which comprises a motor drive for the rear wheels.

11. The bike according to claim 10, wherein the motor drive comprises two motors, each incorporated in a rear wheel.

12. The bike according to claim 11, which comprises a control module for controlling a power applied by each of said motors to each of the rear wheels.

13. The bike according to claim 12, wherein the front wheel comprises a motor that actuates it, the control module also controlling a power applied by the front wheel motor.

14. The bike according to claim 12, which comprises a motor drive for orienting the handlebar, the control module also controlling the handlebar orientation motor.

15. The bike according to claim 12, wherein the control module for the power applied by each of the motors is connected to: a sensor of an angle of the frame relative to a vertical; a sensor of a speed of the bike; and a sensor of an angular position of the handlebar; the control module being configured such that the power applied by each motor of a wheel gives rise to a differential of forces applied by a ground on the bike, this differential matching a moment of these forces relative to a centre of gravity of the bike and of a cyclist, based on the speed, the angular position of the handlebar and the inclination of the bike.

16. The bike according to claim 15, wherein the control module is configured to achieve a gradual curve through bends and good stability of the bike.

17. The bike according to claim 15, wherein the control module is configured to provide a stability of the bike both in a straight line and in bends, by correcting slight inclinations of the bike by managing the forces applied by the motors.

18. The bike according to claim 13, wherein the control module utilizes a function linking values of speed, angular positions of the handlebar, and inclinations of the bike due to the controls of the motors, which function is determined by automatic learning.

19. The bike according to claim 18, wherein the automatic learning is carried out by experienced cyclists and learner cyclists, with a sudden inclination of the bike corresponding to a failure and a long period of time corresponding to a success.

20. The bike according to claim 19, wherein the automatic learning continues with a user of the bike.

* * * * *